US012710153B2

(12) United States Patent
Donoso et al.

(10) Patent No.: US 12,710,153 B2
(45) Date of Patent: Aug. 18, 2026

(54) LIGHT-EMITTING UNIT FOR A LIGHT-EMITTING MODULE FOR A VEHICLE

(71) Applicant: VALEO VISION, Bobigny (FR)

(72) Inventors: Sergio Donoso, Martos (ES); Carlos-Rafael Marcos, Martos (ES)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/997,276

(22) PCT Filed: Jul. 28, 2023

(86) PCT No.: PCT/EP2023/071002
§ 371 (c)(1),
(2) Date: Jan. 21, 2025

(87) PCT Pub. No.: WO2024/023299
PCT Pub. Date: Feb. 1, 2024

(65) Prior Publication Data

US 2026/0036275 A1 Feb. 5, 2026

(30) Foreign Application Priority Data

Jul. 28, 2022 (FR) ....................................... 2207768

(51) Int. Cl.
*F21S 41/36* (2018.01)
*F21S 41/25* (2018.01)

(52) U.S. Cl.
CPC ............... *F21S 41/36* (2018.01); *F21S 41/25* (2018.01)

(58) Field of Classification Search
CPC .. F21S 41/25; F21S 41/33; F21S 41/36; F21S 41/365

(Continued)

(56) References Cited

U.S. PATENT DOCUMENTS

2015/0338047 A1* 11/2015 Honda .................. F21S 41/255 362/517
2018/0142859 A1* 5/2018 Watanabe ............ B60Q 1/0058
(Continued)

FOREIGN PATENT DOCUMENTS

CN 216158966 U 4/2022
WO 2013037799 A1 3/2013
(Continued)

OTHER PUBLICATIONS

European Patent Office, International Search Report (with English translation) and Written Opinion of corresponding PCT Application No. PCT/EP2023/071002 , dated Oct. 30, 2023.
(Continued)

*Primary Examiner* — Thomas M Sember
(74) *Attorney, Agent, or Firm* — Valeo Vision

(57) ABSTRACT

The present invention relates to a luminous unit of a luminous module. The luminous unit includes a luminous subassembly with a first light source and a first collector, a luminous subassembly with a second light source and a second collector, an optical projection system with an optical axis parallel to a longitudinal direction. The collectors are offset along the longitudinal direction and along a transverse direction, the optical projection system includes an optical line focus, the first collector includes a rear end edge disposed in the vicinity of the optical line focus of the optical projection system. The second collector includes an object focus at which the second light source is positioned and an image focus at least partially coincident with the optical line focus of the optical projection system.

13 Claims, 5 Drawing Sheets

(58) Field of Classification Search
USPC .......................... 362/543, 544, 545, 297, 346
See application file for complete search history.

(56) References Cited

U.S. PATENT DOCUMENTS

| | | | | |
|---|---|---|---|---|
| 2021/0231279 | A1* | 7/2021 | Ohashi | F21S 41/663 |
| 2022/0412529 | A1* | 12/2022 | Gromfeld | F21V 7/06 |

FOREIGN PATENT DOCUMENTS

| | | | |
|---|---|---|---|
| WO | 2021099430 | A1 | 5/2021 |
| WO | 2022129426 | A1 | 6/2022 |
| WO | 2022129625 | A1 | 6/2022 |
| WO | 2022162178 | A1 | 8/2022 |
| WO | 2023001851 | A1 | 1/2023 |
| WO | 2023274897 | A1 | 1/2023 |
| WO | 2023031341 | A1 | 3/2023 |

OTHER PUBLICATIONS

European Patent Office, European Office Action (with English Machine-Translation) of corresponding European Application No. 23745573.8, dated Feb. 10, 2026, 4 pages.

* cited by examiner

LIGHT-EMITTING UNIT FOR A LIGHT-EMITTING MODULE FOR A VEHICLE

TECHNICAL FIELD

The present invention relates to the field of automotive vehicle luminous modules, and in particular lighting and/or signaling modules, and relates more particularly to a luminous unit incorporated into such luminous modules.

BACKGROUND OF THE INVENTION

The field of luminous lighting for automotive vehicles is subject to regulations that require each automotive vehicle to be able to carry out lighting functions that comply with specific safety standards. More particularly, the automotive vehicle is equipped with one or more luminous modules dedicated to carrying out each of these functions within each of these modules, at least one light source which is supplied with power in order to emit light rays which exit the luminous module through a lens configured to form a regulatory lighting or signaling light beam.

For reasons of space in particular, it is desirable to equip an automotive vehicle comprising a plurality of luminous modules, each of these luminous modules carrying out a lighting function, or advantageously at least two different lighting functions. Increasing the compactness of such luminous modules makes it possible in particular to limit the manufacturing costs on account of the reduction in electrical connections or raw materials.

However, making a luminous module more compact must not have a negative effect on the effectiveness and/or the uniformity of the light beams resulting from each of the lighting functions. By way of example, some light beams have to be projected so as to have a sharp upper horizontal cutoff and require particular attention to be paid to the structure of the corresponding luminous module.

SUMMARY OF THE INVENTION

The present invention makes it possible to combine sharpness of the light beam formed and compactness of the luminous module by providing a luminous unit of a luminous module of an automotive vehicle, comprising:

- a first luminous subassembly comprising at least a first light source configured to emit a plurality of first light rays and a first collector configured to collect and reflect the first light rays emitted by the first light source,
- a second luminous subassembly comprising at least a second light source configured to emit a plurality of second light rays and a second collector configured to collect and reflect the second light rays emitted by the second light source,
- an optical projection system configured to project the first light rays reflected by the first collector and the second light rays reflected by the second collector, the optical projection system comprising an optical axis parallel to a longitudinal direction.

The luminous unit is noteworthy in that the first collector and the second collector are offset with respect to one another along the longitudinal direction such that the first collector is arranged between the second collector and the optical projection system, and are offset with respect to one another along a transverse direction perpendicular to the longitudinal direction, and in that the optical projection system has an optical line focus parallel or substantially parallel to the transverse direction, the first collector comprising a first rear edge disposed in the vicinity of the optical line focus of the optical projection system, the second collector comprising an object focus at which the second light source is positioned and an image focus at least partially coincident with the optical line focus of the optical projection system.

For each luminous subassembly, the light source is activated when the lighting function or one of the lighting functions in which it is involved is implemented. The light source thus emits a plurality of light rays mainly in the direction of the collector. The latter has a reflective surface facing the light source with which it is associated. In addition, the collector has a shape exhibiting symmetry of revolution, elliptical or parabolic, in order to reflect the light rays in the direction of the optical projection system, irrespective of the point of incidence of the light ray on the reflective surface. For example, the collector has a shape exhibiting symmetry of revolution, elliptical or parabolic, centered on the optical axis of the optical projection system.

The reflected light rays then propagate to the optical projection system, in particular by propagating along a propagation direction that is mainly longitudinal, parallel to the direction of the optical axis of the optical projection system. The optical projection system projects the light rays so as to form the light beam associated with the given lighting function.

The first collector and the second collector are offset with respect to one another along this same longitudinal direction, with a minimum offset such that the collectors take up as little space as possible in order to ensure the compactness of the luminous unit, and of the luminous module.

The longitudinal offset of the collectors with respect to one another is such that the first collector is closer to the optical projection system than the second collector. The rear end edge of the first collector therefore corresponds to the section of the first collector that is spatially closest to the second collector.

The optical projection system has an optical line focus, and not an optical spot focus. The optical line focus extends parallel or substantially parallel to the transverse direction. The optical line focus thus extends substantially along the rear end edge of the first collector.

The optical line focus of the optical projection system is disposed close to the rear end edge of the first collector such that the optical projection system is able to project a light beam representative of the image of the first collector.

Furthermore, the image focus of the second collector is also positioned in the vicinity of the rear end edge of the first collector and of the optical line focus. The image of the second light source formed by the reflection by the second collector is therefore situated in the vicinity of the rear end edge of the first collector and of the optical line focus of the optical projection system. Thus, a uniform transition between the light beams formed by the first luminous subassembly and the second luminous subassembly can be formed, by virtue of these beams being superimposed.

The image focus of the second collector may be linear or curved, as long as it is at least partially coincident with the optical line focus of the optical projection system.

The expression partially coincident should be understood as meaning that when the image focus of the second collector is linear or curved, the focal line of the optical projection system and the focal line forming the image focus of the second collector have at least one intersection point next to the second collector. Furthermore, in one variant, the second collector may have a plurality of discontinuous image foci. In this case, each image focus of the second collector intersects the linear focal line of the optical projection system.

The positioning, specific to the invention, of the optical line focus of the optical projection system, of the rear end edge of the first collector, and of the image focus of the second collector with respect to one another ensures the separate creation of the light beams resulting respectively from the first luminous subassembly and from the second luminous subassembly, and makes it possible to ensure the formation of a light beam at the sharp upper cutoff edge, by imaging of the rear end edge of the first collector.

More particularly, the optical projection system of the luminous unit, said system being common to the two luminous subassemblies, thus helps to form the image of the reflective surface of the first collector, and the image of the second light source, since the two collectors are positioned in the luminous unit and with respect to one another such that the focal line of the optical projection system is disposed in the vicinity of the rear end edge of the first collector and this focal line is at least partially coincident with the image focus of the second collector.

It will be understood from this arrangement that the two collectors are longitudinally offset with respect to one another such that the rear end edge of the first collector is disposed close to the image focus of the second collector.

Furthermore, the first collector and the second collector are offset with respect to one another along a transverse direction perpendicular to the longitudinal direction.

The offset along two directions, with the transverse offset combined with the previous longitudinal offset, makes it possible to optimally carry out two separate lighting functions, realized in this case respectively by each of the luminous subassemblies incorporated within said luminous unit, while limiting the space required for this purpose within the luminous module, by grouping the luminous subassemblies together in a single luminous unit.

The offset along the transverse direction makes it possible in particular to offset the first collector in order that the second collector at least partially faces the optical projection system even though the first collector is interposed between the second collector and the optical projection system. Just as for the offset along the longitudinal direction, the offset along the transverse direction is at a minimum such that the luminous unit according to the invention takes up as little space as possible, the key point being to have the greatest compactness possible while maintaining optimal lighting quality.

According to one feature of the invention, the optical projection system is formed by a projection lens. The projection lens may be part of a projection unit combining a plurality of projection lenses, each of which is inherent to a luminous unit when the luminous module combines a plurality of luminous units.

According to one feature of the invention, the optical projection system is formed by a projection mirror.

According to one feature of the invention, the collectors are positioned with respect to the optical projection system such that the rear end edge of the first collector is positioned between the optical projection system and the optical line focus of this optical projection system. In other words, the optical line focus is at the rear end edge or set back from the rear end edge with respect to the optical projection system. Such positioning helps to enhance the sharpness of the image of the second collector.

According to one feature of the invention, the optical line focus of the optical projection system is disposed at a distance less than or equal to 3 mm from the rear end edge of the first collector.

When the optical line focus is set back from the rear end edge of the first collector with respect to the optical projection system, this maximum distance of 3 mm between the optical line focus of the optical projection system and the rear end edge of the first collector applies in this context.

According to one feature of the invention, the first collector comprises at least two reflective cavities, each of said reflective cavities being offset with respect to one another along the transverse direction. Having two reflective cavities offset with respect to one another along the transverse direction makes it possible to extend the light beam of the first luminous subassembly along the transverse direction and to increase the luminous intensity of the light beam of the first luminous subassembly. Each reflective cavity comprises a reflective surface from which the light rays specifically intended to interact with each of said reflective cavities are reflected, and the set of reflective cavities of a luminous subassembly forms the collector of said luminous subassembly.

The reflective cavities of the first collector can thus be adjacent to one another, or at a distance from one another, being offset from one another along the transverse direction.

It should be noted that in the case of a first collector formed by a plurality of reflective cavities, the rear end edge of the first collector, as mentioned above, may consist of a rear end edge of one of the cavities that form the first collector or be the succession of two rear end edges if the cavities are adjacent.

According to one feature of the invention, the reflective cavities of the first collector are arranged on either side of the second collector along the transverse direction. In other words, the reflective cavities of the first collector are spaced apart from one another in order that the light rays output by the second collector can propagate to the optical projection system by passing between the reflective cavities of the first collector rather than being obstructed thereby. In particular, the first collector comprises at least one reflective cavity disposed on each side of the second collector, said reflective cavities being spaced apart such that the second light rays reflected by the second collector can propagate to the optical projection system by passing between said reflective cavities. Such a configuration makes it possible to implement the lighting function associated with the second luminous subassembly in spite of the presence of the first luminous subassembly and the compactness of the luminous unit, and of the luminous module.

According to one feature of the invention, the second collector comprises at least two reflective cavities, each of said reflective cavities being offset with respect to one another along the transverse direction. Just like the reflective cavities of the first collector, the second collector may also have a plurality of reflective cavities allowing the light beam output by the second luminous subassembly to extend along one or more directions, for example transverse direction if the reflective cavities of the second collector are adjacent to one another along the transverse direction. The plurality of reflective cavities also make it possible to enhance the luminous intensity of the light beam output by the second luminous subassembly. The number and surface area of the reflective cavities of the second collector have to make it possible to form a uniform light beam.

It should be noted that in the case of a second collector formed by a plurality of reflective cavities, each reflective cavity may have an image focus different than that of the adjacent reflective cavity of this second collector, and in this context, the luminous unit according to the invention is configured such that the optical line focus of the optical projection system forms an intersection with each of the image foci of the reflective cavities that form the second collector.

According to one feature of the invention, the first collector and the second collector are offset with respect to one along a vertical direction perpendicular to the longitudinal direction and to the transverse direction. This offset along the vertical direction makes it possible to create more space in order that the second collector can partially face the optical projection system, said offset being along a direction other than the transverse direction.

According to one feature of the invention, the luminous module comprises a printed circuit board bearing all of the first and second light sources. This single printed circuit board therefore bears at least the first light source and the second light source that were mentioned above. The printed circuit board is configured to make it possible to control the functioning of the light sources, for example following a manual command made by a user of the vehicle, and consequently to turn on or turn off one or the other of the light sources. Using only one printed circuit board for all of the light sources makes it possible to reduce the space requirement of the luminous unit, and therefore of the luminous module in which the luminous unit is incorporated. Furthermore, the use of a single printed circuit board makes it possible to limit the connections and the assembly compared with the use of a plurality of printed circuit boards.

According to one feature of the invention, the printed circuit board has an inclination of between 5° and 15° with respect to a plane perpendicular to the vertical direction. Such an inclination makes it possible to position the light sources closer to their respective collectors. This then generates reflection of a greater number of light rays and thus improves the intensity of the light beams exiting the optical projection system.

According to one feature of the invention, the first luminous subassembly is configured to cooperate with the optical projection system in order to generate a first light beam with a cutoff edge formed by the imaging of the rear end edge of the first collector, and the second luminous subassembly is configured to cooperate with the optical projection system in order to generate a second light beam different than the first light beam, at least a part of which is situated above the cutoff edge. The cutoff edge forms an upper cutoff in the first light beam. The second light beam may in particular have a greater intensity than the first light beam.

As mentioned above, each luminous subassembly can carry out a lighting function that is inherent thereto. A plurality of lighting functions can therefore be carried out by a single luminous unit, and therefore within a single luminous module. In particular, in the context that has just been mentioned, the first luminous subassembly is capable of generating a light beam corresponding to a low beam, or to a portion of a low beam, that is to say with a sharp cutoff edge forming an upper cutoff in the first light beam, and which makes it possible in particular not to dazzle other road users, and the second luminous subassembly is capable of generating a light beam, at least a part of which is situated above the cutoff edge, and which may, for example, be superimposed on the first light beam in order to form a light beam of the high beam type, or be an intensification of a light beam, at the center thereof, in order to form a light beam of the high beam type.

The invention also covers an automotive vehicle luminous module comprising at least one luminous module as described above.

According to one feature of the invention, the luminous module comprises at least a first luminous unit and a second luminous unit, the first luminous unit being as described above. The plurality of luminous units therefore make it possible to further multiply the lighting functions within one and the same luminous module.

According to one feature of the invention, the second luminous unit comprises at least one additional luminous subassembly and an additional optical projection system. The additional luminous subassembly or subassemblies may carry out lighting functions different than the functions of the luminous subassemblies that are provided by the first luminous unit.

The additional projection system may be formed by an additional projection mirror or by an additional projection lens.

According to one feature of the invention, when the optical projection system of the first luminous unit is formed by a projection lens, the additional optical projection system may also be formed by a projection lens, referred to as additional projection lens. Where appropriate, the luminous module comprises a projection unit divided into a first portion delimiting the projection lens of the first luminous unit and a second portion delimiting the additional projection lens of the second luminous unit. In other words, the projection unit can be divided into a plurality of optical elements, including the projection lens of the first luminous unit and the additional projection lens of the second luminous unit, each of the optical elements being attached to a luminous unit that is inherent thereto. The features of each of the optical elements of the projection unit may vary depending on the objectives to be met by the light beams formed by each of the luminous units.

BRIEF DESCRIPTION OF DRAWINGS

Further features and advantages of the invention will also become apparent both from the following description and from a number of exemplary embodiments given by way of nonlimiting indication with reference to the attached schematic drawings, in which.

DETAILED DESCRIPTION OF THE INVENTION

Figure 1:
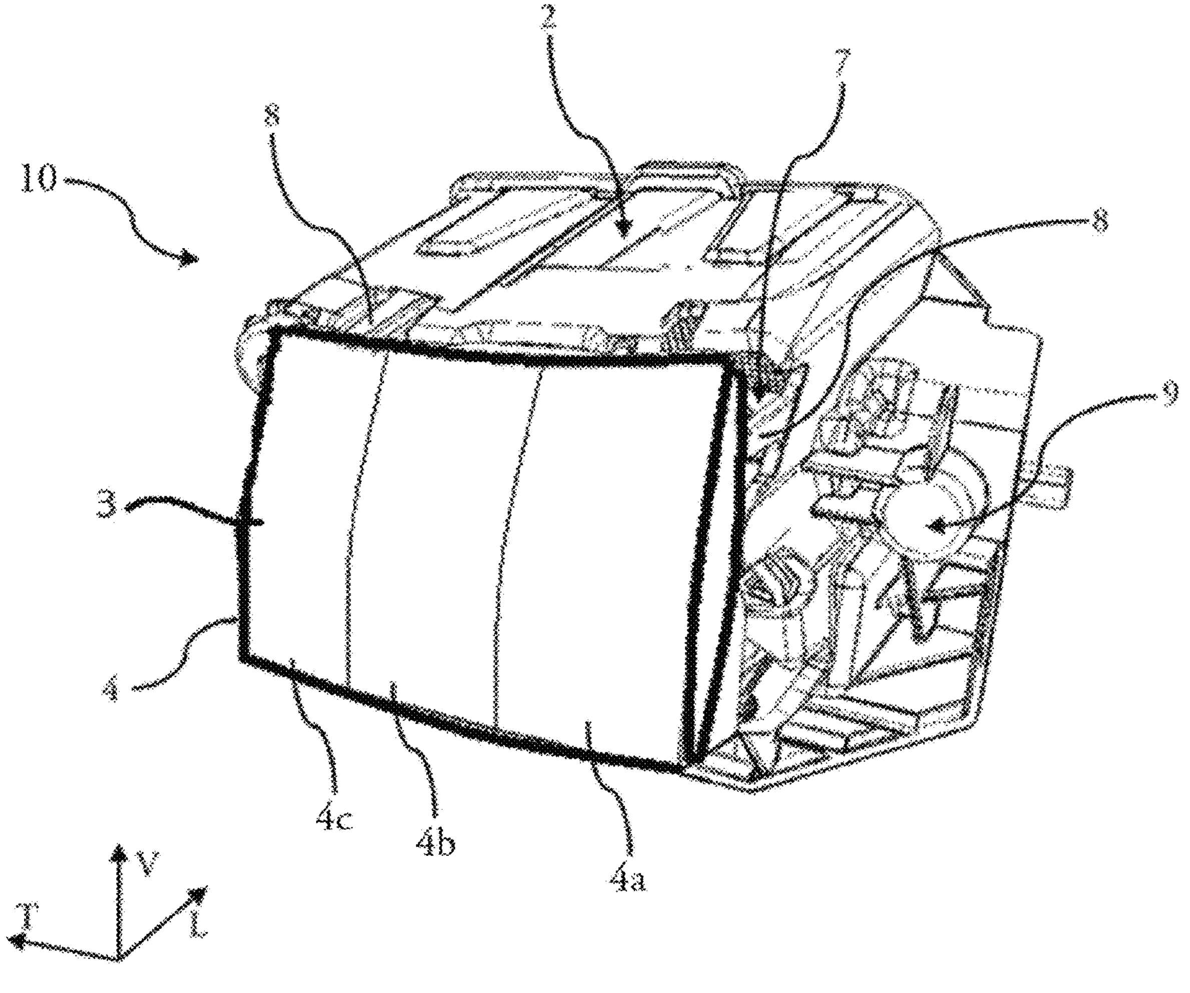
FIG. 1 is a depiction of a lighting and signaling module incorporating a luminous module according to the invention.

FIG. 1 is an overall view of a luminous module 10 according to the invention. The luminous module 10 may, for example, be incorporated into an automotive vehicle, for example into a headlamp of the automotive vehicle, in order to fulfill at least one lighting function when said vehicle is running. In this regard, the luminous module 10 may, in particular, be arranged at the front of the vehicle.

The luminous module 10 is housed in a mask 2. The luminous module 10 is configured to carry out a plurality of light functions or at the very least to contribute to the emission of a plurality of lighting functions onto the road. The luminous module ensures the emission and the propagation of light rays until they pass through a projection unit 4.

As will be described in detail below, the luminous module 10 comprises a plurality of luminous units that carry out one or more lighting functions, and in particular the luminous unit according to the invention.

The projection unit 4 is divided into a plurality of portions 4*a*, 4*b*, 4*c*. In the example in FIG. 1, each luminous unit of the luminous module 10 comprises a projection lens. Each portion 4*a*, 4*b*, 4*c* is then formed by the projection lens of a luminous unit of the luminous module. Alternatively, as will be described in detail below with reference to FIG. 5, each luminous unit of the luminous module 10 may comprise a projection mirror instead of the projection lens. Each portion 4*a*, 4*b*, 4*c* of the optical projection unit 4 may then be formed by the projection mirror of a luminous unit of the luminous module.

The mask 2 is configured to at least partially house the luminous module 10. This mask 2 has an opening 7 which covers the projection unit 4, and the luminous module 10 is configured to direct the light rays emitted in the direction of this opening 7.

Figure 2:
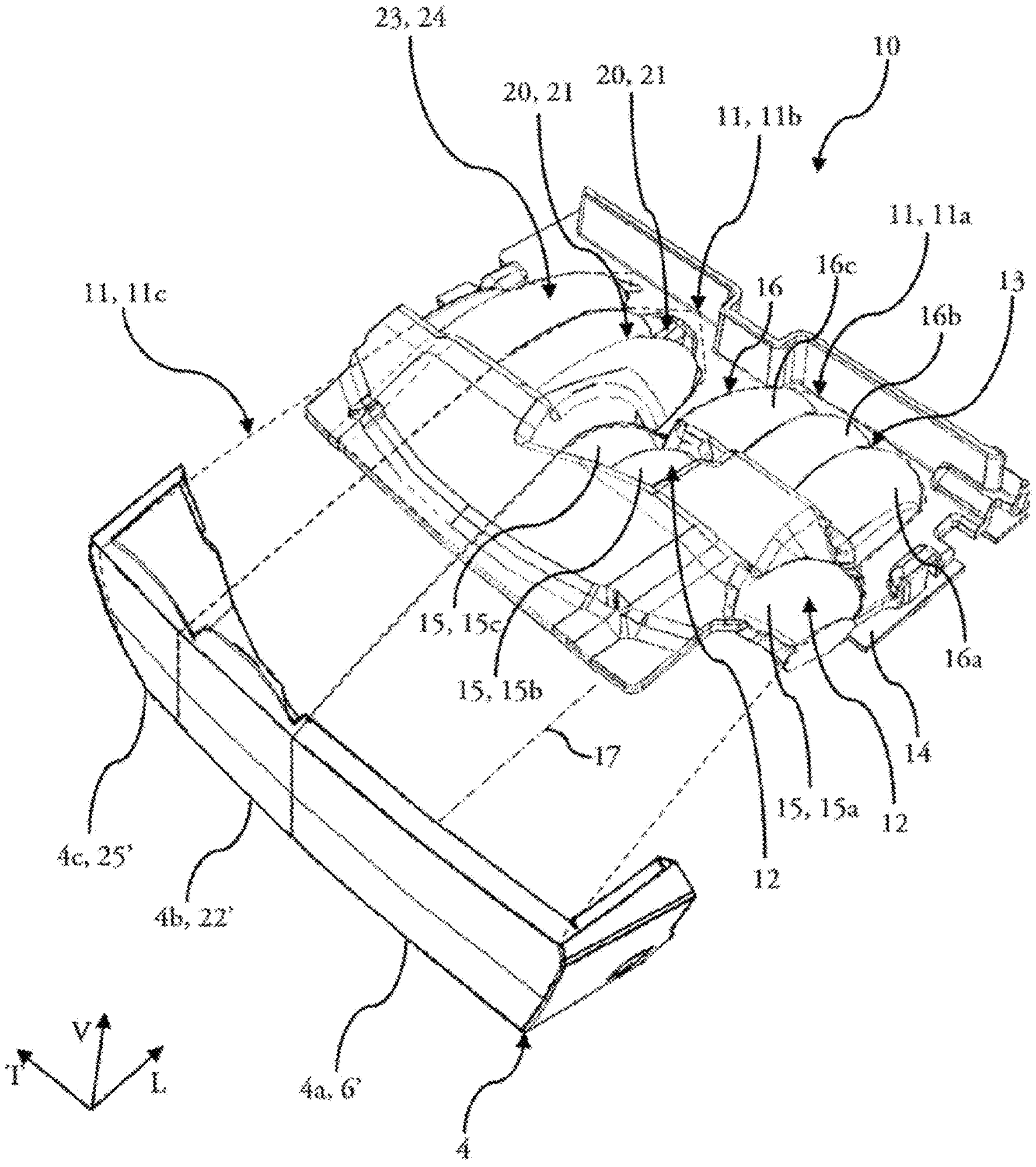
FIG. 2 shows the luminous module according to the invention in a perspective view revealing a projection lens, a printed circuit board and a plurality of collectors fastened to this printed circuit board.

FIG. 2 shows the luminous module 10 from FIG. 1, from which the mask 2 has been removed. The luminous module 10 comprises at least one luminous unit according to the invention.

In particular, the luminous module 10 comprises a plurality of luminous units 11. Each of the luminous units comprises at least one light source, at least one collector, and an optical projection system.

In the example in FIG. 2, as explained above, the optical projection system of each luminous unit 11 is formed by a projection lens 6, 22, 25. Each projection lens 6, 22, 25 forms in this case one of the portions 4*a*, 4*b*, 4*c* of the projection unit 4.

Figure 5:
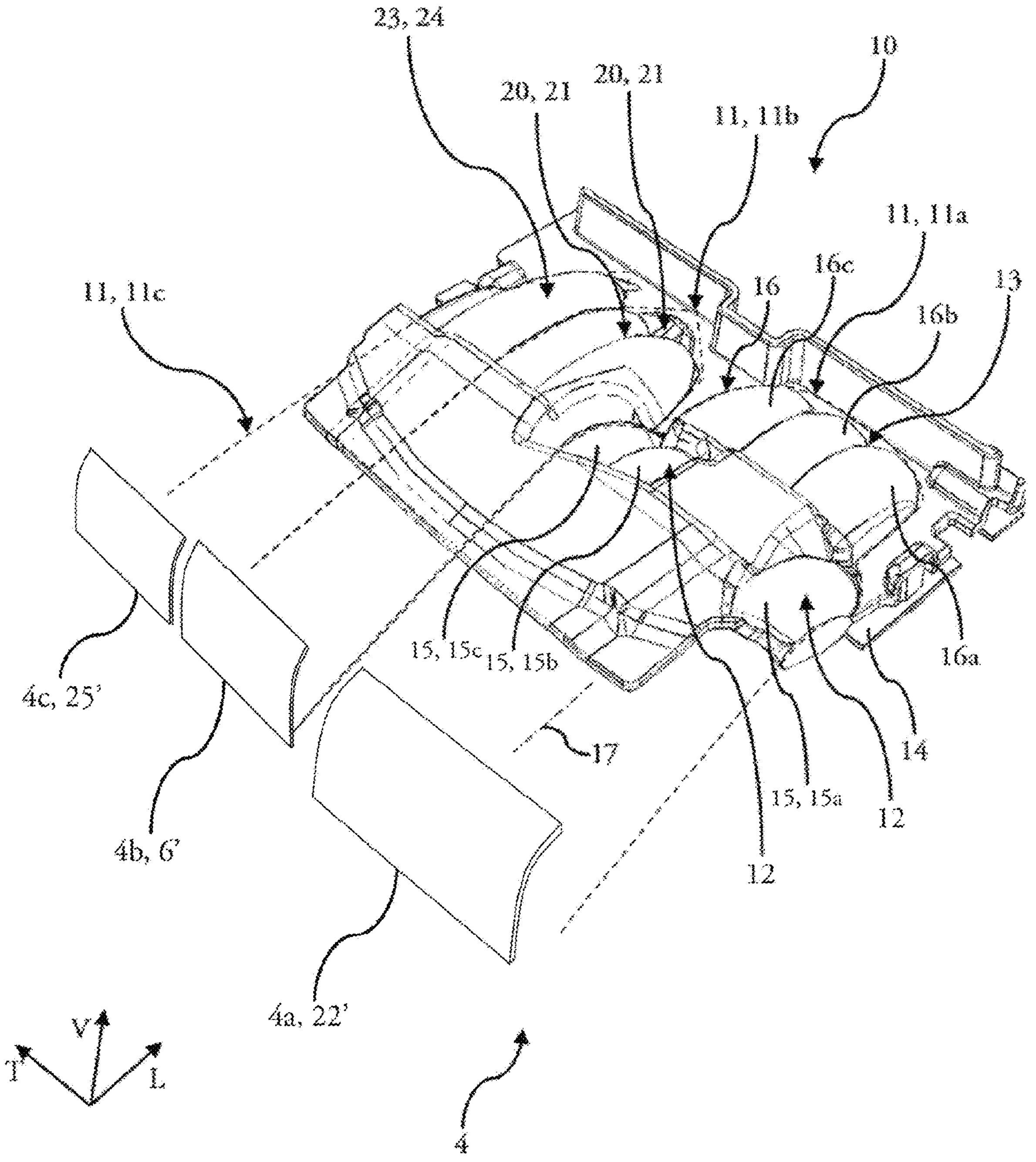
FIG. 5 shows a luminous module according to a variant of the invention, revealing a projection mirror.

Alternatively, and as shown in FIG. 5, the optical projection system of each luminous unit 11 may be formed by a projection mirror 6', 22', 25'. Each projection mirror 6', 22', 25' then forms one of the portions 4*a*, 4*b*, 4*c* of the projection unit 4.

It will be noted that FIG. 5 is only intended to illustrate an embodiment variant of a luminous module 10 according to the invention, in which the optical projection unit of the luminous units 11 is formed by a projection mirror. Thus, except for the optical projection system, the luminous module shown in FIG. 5 is identical to the luminous module 10 shown in FIGS. 1-4. All the features described with reference to FIGS. 1-4 therefore apply, mutatis mutandis, to the luminous module illustrated in FIG. 5, except that the features described for the projection lens apply to the projection mirror. In particular, the features that relate to the position of the focus of the projection lens apply to the position of the focus of the projection mirrors.

More particularly, in FIGS. 2 and 5, the luminous module 10 comprises a first luminous unit 11*a*, a second luminous unit 11*b* and a third luminous unit 11*c*. In FIGS. 2 and 5, the three luminous units 11 are delimited by dashed lines to make it easier for the reader to understand.

The first luminous unit 11*a* is the luminous unit 11 according to the invention. This comprises a first luminous subassembly 12 and a second luminous subassembly 13. Each luminous subassembly 12, 13 of the first luminous unit 11*a* comprises a light source and a collector. In addition, each of the luminous subassemblies 12, 13 at least partially carries out a lighting function inherent thereto within the luminous module 10. The latter can thus execute a plurality of lighting functions while using a minimum of space.

In FIGS. 2 and 5, the light sources are not visible. These are connected to at least one printed circuit board 14. The luminous module 10 may comprise a single printed circuit board 14 bearing all of the light sources, and in particular the light sources of each luminous unit 11*a*, 11*b*, 11*c*, irrespective of the number of light sources. Alternatively, the luminous module 10 may comprise as many printed circuit boards 14 as there are luminous units 11.

Each of the light sources, when they are active in order to execute the lighting function in question, emits light rays in the direction of the collector that is inherent to each of the light sources. The collector or collectors has or have a reflective surface and a shape such that the light rays are collected and reflected in the direction of the projection unit 4, which projects each of said light rays in order to form a light beam corresponding to one or more lighting functions carried out by the luminous module 10.

In order to project the light beams resulting from the first luminous subassembly 12 and/or the second luminous subassembly 13, the first luminous unit 11*a* comprises a projection lens 6 incorporated into the projection unit 4. In FIG. 2, the projection lens 6 corresponds to the first portion 4*a* of the projection unit 4. The projection lens 6 is arranged so as to face the light rays emitted by the first luminous subassembly 12 and by the second luminous subassembly 13. The projection lens 6 is configured to have an optical axis 17 extending along a longitudinal direction L. In the example in FIG. 5, the first luminous unit 11*a* comprises a projection mirror 6' incorporated into the projection unit 4.

Figure 4:
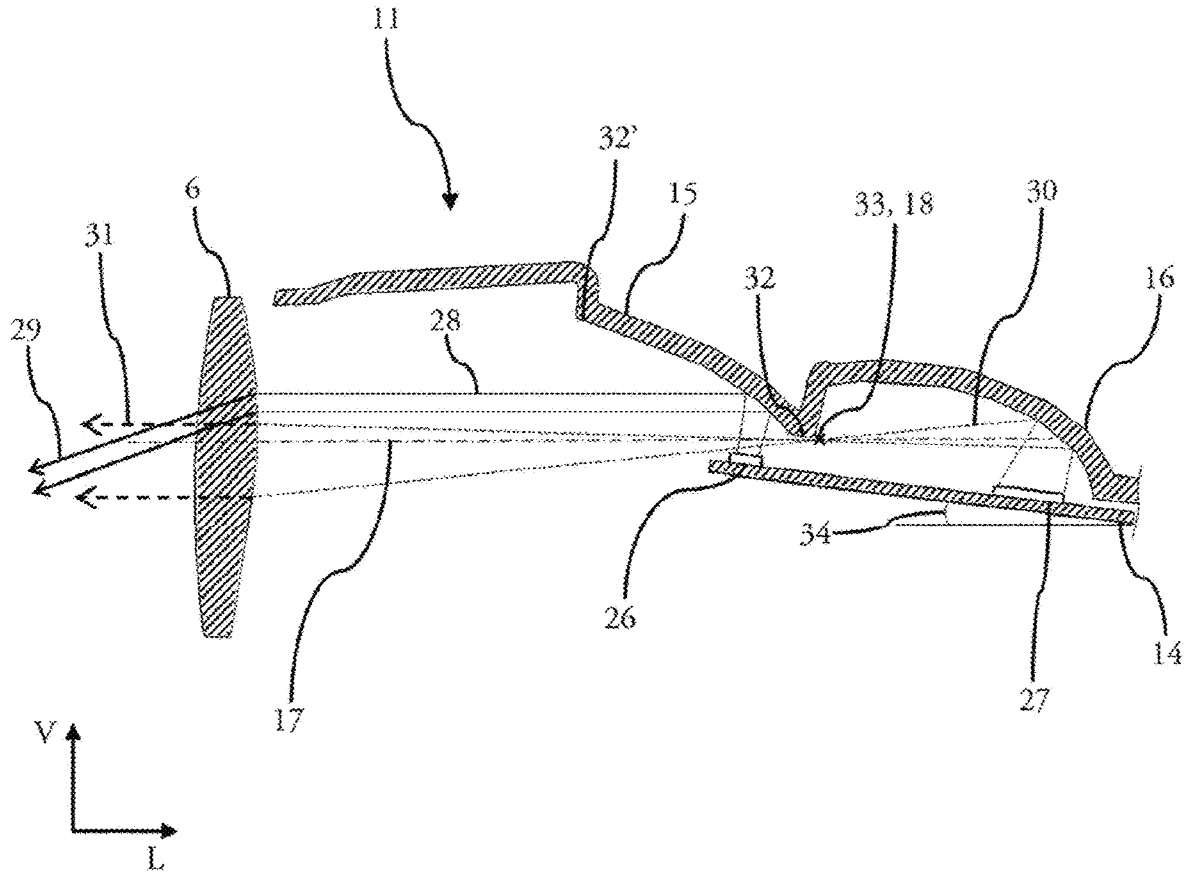
FIG. 4 is a view in cross section, on the section plane IV-IV in FIG. 3, of a luminous unit according to the invention that is incorporated within the luminous module, showing, by way of example, lines of light rays that are able to be reflected within the luminous unit according to the invention.

The first luminous subassembly 12 of the first luminous unit 11*a* comprises at least a first light source 26, visible in FIG. 4, and a first collector 15, while the second luminous subassembly 13 comprises a second light source 27, visible in FIG. 4, and a second collector 16. Each of the collectors 15, 16 has the function of collecting and reflecting the light rays emitted by the light source that is inherent thereto. As is shown in FIGS. 2 and 5, the first collector 15 and the second collector 16 exhibit an offset with respect to one another, at least along the longitudinal direction L, with the second collector 16 being arranged behind the first collector 15. In other words, a distance between the projection lens 6 (or the projection mirror 6') and the second collector 16 is therefore greater than a distance between the projection lens 6 (or the projection mirror 6') and the first collector 15. The first collector 15 and the second collector 16 are also offset with respect to one another along a transverse direction T perpendicular to the longitudinal direction L. The offset along the transverse direction T ensures the propagation of all of the light rays relative to the first luminous unit 11*a* as far as the projection lens 6 (or the projection mirror 6'), in spite of the offset between the first collector 15 and the second collector 16 along the longitudinal direction L.

Each collector may be divided into one or more reflective cavities. Multiplying the number of reflective cavities within a single collector, and therefore within a single luminous subassembly, helps for example to enhance the intensity and/or the extent along one or more given directions of the light beam formed on exiting said luminous subassembly.

In FIGS. 2 and 5, the first collector 15 is divided into a first reflective cavity 15*a*, into a second reflective cavity 15*b*, and into a third reflective cavity 15*c*. For its part, the second collector 16 is divided into a first reflective cavity 16*a*, into a second reflective cavity 16*b*, and into a third reflective cavity 16*c*. The reflective cavities 15*a*, 15*b*, 15*c* of the first collector 15 are offset with respect to one another along the transverse direction T. The same goes for the reflective cavities 16*a*, 16*b*, 16*c* of the second collector 16, which are also offset from one another along the transverse direction T.

The three reflective cavities 16*a*, 16*b*, 16*c* of the second collector 16 are in contact with and adjacent to one another such that the second reflective cavity 16*b* is interposed between the first reflective cavity 16*a* and the third reflective 16*c*.

The three reflective cavities 15*a*, 15*b*, 15*c* of the first collector 15 are arranged such that the second reflective cavity 15*b* and the third reflective cavity 15*c* are in contact with and adjacent to one another, while the first reflective cavity 15*a* is aligned with the second reflective cavity 15*b* and the third reflective cavity 15*c* along the longitudinal direction L, but is at a distance therefrom along the transverse direction T.

The reflective cavities 15*a*, 15*b*, 15*c* of the first collector 15 are thus positioned such that at least two of them are arranged on either side of the second collector 16 with respect to the transverse direction T. In FIGS. 2 and 5, the second collector 16, more particularly the reflective cavities 16*a*, 16*b*, 16*c* of the second collector, are disposed between the first reflective cavity 15*a* of the first collector 15 and a group made up of the second reflective cavity 15*b* and the third reflective cavity 15*c*. Such an arrangement makes it possible to improve the compactness of the first luminous unit 11*a* while optimally carrying out all the lighting functions of said first luminous unit 11*a*.

Each of the groups of reflective cavities thus forms a single collector. The reflective cavities that are inherent to each of the collectors therefore collect and reflect light rays intended to execute one and the same lighting function. To this end, the projection lens 6 (or the projection mirror 6'), that is to say the first portion 4*a* of the projection unit 4, faces all of the reflective cavities of the collectors of the first luminous unit 11*a*.

The reflective surfaces of each collector, and in particular the reflective cavities 15*a*, 15*b*, 15*c* of the first collector 15, and the reflective cavities 16*a*, 16*b*, 16*c* of the second collector 16, advantageously have a profile of the elliptical or parabolic type. According to one variant, the reflective surfaces form a surface of revolution about an axis parallel to the optical axis 17. This axis parallel to the optical axis 17 may in particular correspond to the optical axis of the collector.

As was mentioned above, the luminous module 10 illustrated in FIGS. 2 and 5 comprises three luminous units 11. Thus, the second luminous unit 11*b* and the third luminous unit 11*c* also comprise one or more luminous subassemblies, the lighting functions of which, which result therefrom, differ or may differ from the lighting functions executed by the first luminous subassembly 12 and by the second luminous subassembly 13 of the first luminous unit 11*a*.

It is therefore possible to observe that the second luminous unit 11*b* comprises at least one additional luminous subassembly 20 provided with one or more additional light sources and with one or more additional collectors 21, and an additional projection lens 22 in the example in FIG. 2, or an additional projection mirror in the example in FIG. 5. The additional luminous subassemblies 20 each at least partially execute a lighting function that is inherent thereto and are arranged so as to emit and reflect light rays to the additional projection lens 22 in the example in FIG. 2 or to the additional projection mirror 22' in the example in FIG. 5, corresponding to the second portion 4*b* of the projection unit 4.

For its part, the third luminous unit 11*c* comprises an additional luminous subassembly 23 provided with an additional light source and an additional collector 24, and an additional projection lens 25 in the example in FIG. 2, or an additional projection mirror 25' in the example in FIG. 5. The light rays emitted and reflected by the additional luminous subassembly 23 are subsequently projected by the additional projection lens 25 in the example in FIG. 2, or the additional projection mirror 25' in the example in FIG. 5, corresponding to the third portion 4*c* of the projection unit 4.

Figure 3:
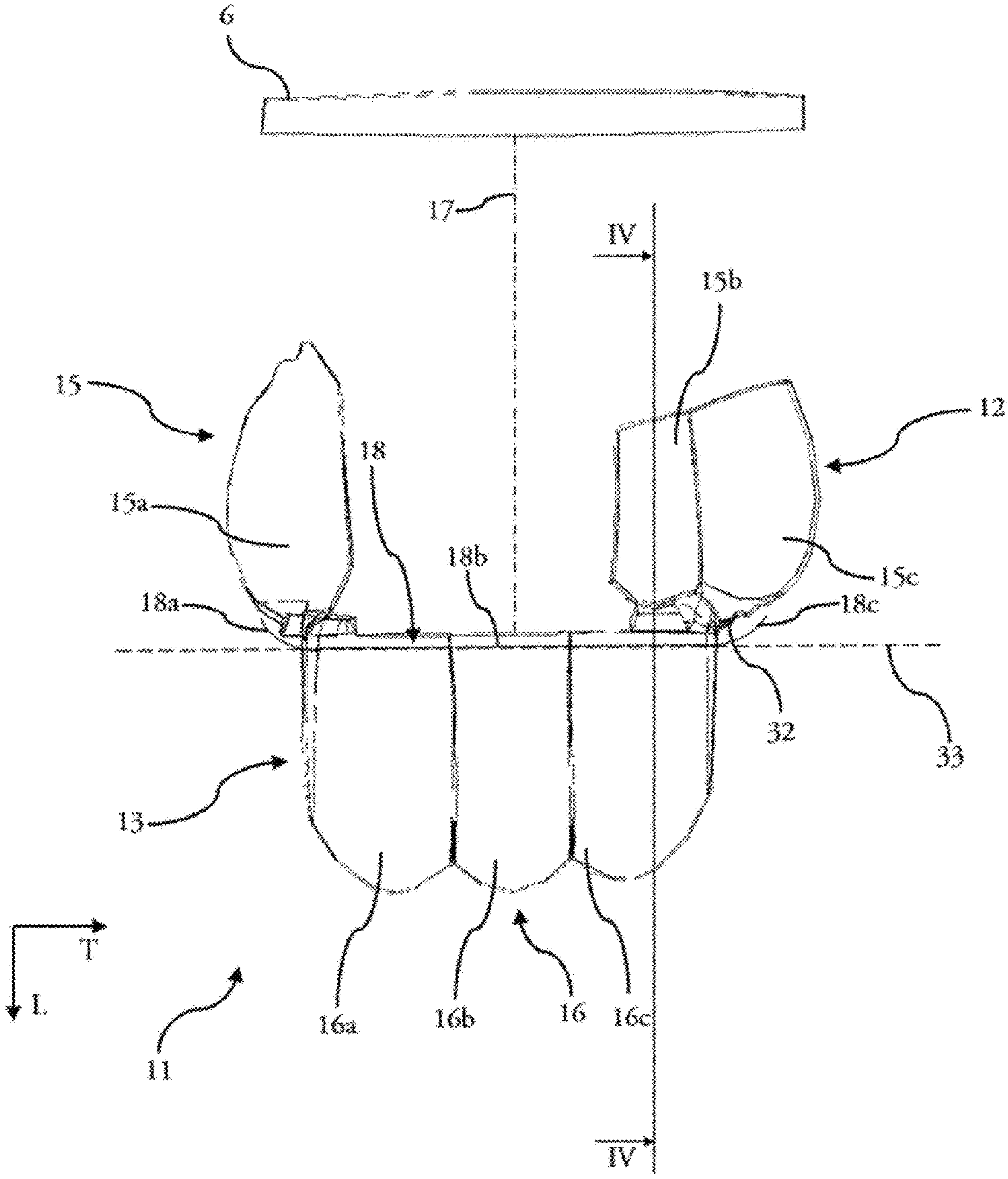
FIG. 3 shows a top view of a luminous module according to the invention.

FIG. 3 is a top view of the luminous unit 11 according to the invention, corresponding to the first luminous unit 11*a* in FIG. 2.

As was described above, the first collector 15 and the second collector 16 are arranged so as to be offset with respect to one another both along the longitudinal direction L and along the transverse direction T. The offset along the transverse direction T makes it possible to offset the first collector 15 on either side of the second collector 16 so as not to obstruct propagation of the light rays reflected by the second collector 16 to the projection lens 6, the second collector 16 being set back from the first collector 15 along the longitudinal direction L.

The projection lens 6 is configured so as to have an optical line focus 33 which extends mainly along the transverse direction T, perpendicularly to the optical axis 17. In the example illustrated, the focal line that this optical line focus 33 forms has been depicted in a slightly curved manner, but it should be noted that this focal line may be straight without otherwise limiting the invention.

The optical line focus 33 is positioned such that the first collector 15, more specifically a rear end edge 32 of the first collector 15, is arranged between the projection lens 6 and the optical line focus 33 thereof. Preferably, the optical line focus 33 of the projection lens 6 is disposed at a distance less than or equal to 3 mm from the rear end edge 32 of the first collector 15. The rear end edge 32 of the first collector 15 is understood to be the rear end edge 32 delimiting one or more reflective cavities 15*a*, 15*b*, 15*c*. In the example illustrated, the point of the rear end edge 32 of the first collector 15 that is set back farthest from the projection lens 6 is disposed between the latter and the optical line focus 33.

It will be noted that the position of the optical line focus 33 has been described for an optical projection system formed by a projection lens 6 as shown in FIGS. 2 and 3. It will be understood that the same characteristics apply to the optical line focus of the optical projection system formed by a projection mirror 6' as illustrated in FIG. 5.

The first collector 15 comprises an object focus in the vicinity of which the first light source 26 is disposed, and an image focus disposed in the vicinity of the optical projection system, or downstream of the optical projection system in the direction of emission of light from the luminous module 10.

The second collector 16 has an object focus, in the vicinity of which the corresponding light source is disposed, in this case the second light source 27, and has an image focus 18. The object focus and the image focus 18 may be common to all the reflective cavities of the second collector 16, or each reflective cavity 16*a*, 16*b*, 16*c* may have an object focus and an image focus 18*a*, 18*b*, 18*c*.

As was mentioned for the focal line associated with the projection lens 6, the image focus 18*a*, 18*b*, 18*c* of the reflective cavities 16*a*, 16*b*, 16*c* of the second collector 16 may be straight, like the image focus 18*b* associated, in the example in FIG. 3, with the second reflective cavity 16*b* of the second collector 16, or at least partially curved, like the image foci 18*a*, 18*b* of the first reflective cavity 16*a* and of the third reflective cavity 16*c* of the second collector 16. These image foci have been depicted in bold in FIG. 3 to make them more particularly visible. Alternatively, the image foci 18*a*, 18*b*, 18*c* may be spot foci.

The light rays emitted by a light source associated with the second collector, and disposed in the vicinity of the object focus of this second collector, are reflected by the reflective surface of this second collector 16 in the direction of the corresponding image focus. According to the invention, in order to project a wide light beam resulting from the second luminous subassembly 13, the image focus 18, or each of the image foci 18*a*, 18*b*, 18*c*, of the second collector 16 is at least partially coincident with the optical line focus 33 of the projection lens 6. Such a configuration thus makes it possible to combine sharpness and compactness, in order that the luminous unit, and therefore the luminous module fulfill a maximum of light functions while using a minimum of space.

FIG. 4 is a view in cross section of the luminous unit 11 according to the invention. It is still the first luminous unit 11*a* from FIG. 2. The cross section in FIG. 4 is on a plane IV-IV that is visible in FIG. 3 and defined by the longitudinal direction L and a vertical direction V perpendicular to the longitudinal direction L and to the transverse direction T. The cross section in FIG. 4 passes through the second reflective cavity 15*b* of the first collector 15 and through the third reflective cavity 16*c* of the second collector 16, which are shown in FIG. 3.

FIG. 4 makes it possible to see the printed circuit board 14, and some of the light sources that it bears, FIG. 4 illustrating in particular the first light source 26 disposed next to the first collector 15 and the second light source 27 disposed next to the second collector 16, as mentioned above.

Each of the light sources 26, 27 is activated when the function associated with the luminous subassembly in question needs to be implemented. The activation and/or the deactivation of one or the other of the light sources 26, 27 may be effected manually by the driver of the vehicle, or automatically for example on the basis of data measured by a light detector (not shown).

FIG. 4 illustrates in particular the propagation of light rays for each of the luminous subassemblies comprised by the first luminous unit 11*a*. The first light source 26, when activated, emits first light rays 28, depicted by way of solid lines in FIG. 4, which propagate to the reflective surface of the first collector 15 and are collected and reflected by said surface. The propagation of the reflected first light rays 28 takes place as far as the projection lens 6, which projects them in order to form a first light beam 29.

Similarly, the propagation of light rays within the second luminous subassembly of the first luminous unit 11*a* is also illustrated. The second light source 27 thus emits second light rays 30, depicted by way of dotted lines in FIG. 4, which are reflected by the reflective surface of the second collector 16 and propagate to the projection lens 6 and form a second light beam 31 on exiting said lens.

The second light source 27 is disposed at the object focus of the reflective surface of the second collector 16, such that the rays that it emits are collected and reflected along the optical axis 17 in the direction of the corresponding image focus 18. As illustrated for some rays by way of example in FIG. 4, the second light rays 30 converge toward this image focus 18 after having been reflected by the reflective surface of the second collector 16. As was mentioned above, the image focus 18 is advantageously at least partially coincident with the optical line focus 33, such that the rays that have passed through or substantially in the vicinity of the image focus 18 are projected to infinity by the projection lens 6. The image focus 18 and the optical line focus 33 are depicted here in the form of a spot on account of the orientation of the view in cross section in FIG. 4.

Besides the offset along the longitudinal direction L between the first collector 15 and the second collector 16, the latter is also offset with respect to the first collector 15 along the vertical direction V, the second collector 16 being closer to the printed circuit board 14 than the first collector 15 is. This offset further improves the propagation of the reflected second light rays 30 in addition to the offset along the transverse direction between the first collector 15 and the second collector 16.

In the example illustrated, the printed circuit board 14 has an inclination with respect to a plane defined by the longitudinal direction L and the transverse direction. The printed circuit board 14 has an angle of inclination 34 of between 5° and 15° with respect to said plane. This inclination makes it possible to orient the first light source 26 and the second light source 27, respectively, further toward the curvature of the first collector 15 and of the second collector 16 in order to promote the reflection of the light rays.

As is visible in FIG. 4, the first light beam 29 resulting from the first luminous subassembly is oriented below the optical axis, that is to say toward the road. This is a light beam associated with a first lighting function that needs to be precise and sharp, in particular at its upper cutoff edge, formed by the imaging of the rear end edge 32. This first lighting function may in particular consist of a low beam intended to illuminate the road without otherwise dazzling road users traveling toward the vehicle. Alternatively, this first lighting function may consist of a part of a low beam, having, for example, a horizontal upper cutoff situated below the horizon. A front end edge 32' of the first collector 15, that is to say the edge closest to the projection lens 6, delimits a lower part of the luminous image formed and projected onto the road, and the rear end edge 32 delimits an upper part of said image, when the luminous unit 11 is oriented in a mounting position, that is to say when the luminous module with which it is associated is mounted in the vehicle.

The second light beam 31 resulting from the second luminous subassembly is a light beam associated with a second lighting function, at least a part of which is situated above the cutoff edge of the first light beam 29. The second light beam 31 may, for example, be superimposed on the first light beam 29 in order to form a light beam of the high beam type. This second lighting function thus consists of the upper part of a high beam, intended to illuminate the entire road far in front of the vehicle, when no user is likely to be dazzled. Alternatively, the second light beam 31 may be an intensification of a light beam, for example at the center of this light beam, in order to form a light beam of the high beam type. Thus, the second light beam 31 does not require as much sharpness of the contours as the lighting function carried out by the first light beam 29.

The positions of the collector 15, 16 with respect to one another and of the optical line focus 33 of the optical projection system with respect to the rear end edge 32 of the first collector 15 and with respect to the image focus 18 of the second collector 16, as have been described and illustrated, make it possible to provide a first luminous unit 11*a* according to the invention, and a luminous module which combine compactness and the achievement of a light beam for which the cutoff needs to be sharp, the positioning of the optical line focus of the projection lens in the vicinity of the rear end edge of the first collector associated with the first lighting function making it possible to form a cutoff edge of the beam in a sharp manner by imaging of the rear end edge of the first collector 15 while the positioning of this optical line focus of the projection lens with respect to the image focus 18 of the second collector 16 makes it possible to project an image of a beam that is able to supplement the beam having a cutoff edge in order to form a second lighting function.

Of course, the invention is not limited to the examples that have just been described, and numerous modifications may be made to these examples without departing from the scope of the invention.

The invention, as has just been described, clearly achieves its stated aim, and makes it possible to provide a luminous unit of a luminous module combining a plurality of lighting functions in as compact a manner as possible by combining several offsets between at least two luminous subassemblies of said luminous unit. Variants that are not described here may be implemented without departing from the context of the invention, provided that, in accordance with the invention, they comprise a luminous unit according to the invention.

What is claimed is:

1. A luminous unit of a luminous module of an automotive vehicle, comprising:

a first luminous subassembly includes at least a first light source configured to emit a plurality of first light rays and a first collector configured to collect and reflect the first light rays emitted by the first light source, a second luminous subassembly includes at least a second light source configured to emit a plurality of second light rays and a second collector configured to collect and reflect the second light rays emitted by the second light source, an optical projection system configured to project the first light rays reflected by the first collector and the second light rays reflected by the second collector, the optical projection system includes an optical axis parallel to a longitudinal direction, wherein the first collector and the second collector are offset with respect to one another along the longitudinal direction such that the first collector is arranged between the second collector and the optical projection system, and are offset with respect to one another along a transverse direction perpendicular to the longitudinal direction, and the optical projection system has an optical line focus parallel or substantially parallel to the transverse direction, the first collector includes a first rear edge disposed in a vicinity of the optical line focus of the optical projection system, the second collector includes an object focus at which the second light source is positioned and an image focus at least partially coincident with the optical line focus of the optical projection system, wherein the first collector includes at least two reflective cavities, each of the reflective cavities being offset with respect to one another along the transverse direction.

2. The luminous unit as claimed in claim 1, wherein the optical projection system is formed by a projection lens.

3. The luminous unit as claimed in claim 1, wherein the collectors are positioned with respect to the optical projection system such that the rear end edge of the first collector is positioned between the optical projection system and the optical line focus of this optical projection system.

4. The luminous unit as claimed in claim 1, wherein the optical line focus of the optical projection system is disposed at a distance less than or equal to 3 mm from the rear end edge of the first collector.

5. The luminous unit as claimed in claim 1, wherein the reflective cavities of the first collector are arranged on either side of the second collector along the transverse direction.

6. The luminous unit as claimed in claim 5, wherein the first collector has at least one reflective cavity disposed on each side of the second collector, the reflective cavities being spaced apart such that the second light rays reflected by the second collector can propagate to the optical projection system by passing between the reflective cavities.

7. The luminous unit as claimed in claim 1, wherein the second collector includes at least two reflective cavities, each of the reflective cavities being offset with respect to one another along the transverse direction.

8. The luminous unit as claimed in claim 1, wherein the first collector and the second collector are offset with respect to one along a vertical direction perpendicular to the longitudinal direction and to the transverse direction.

9. The luminous unit as claimed in claim 1, further comprising a printed circuit board bearing all of the light sources.

10. The luminous unit as claimed in claim 1, wherein the first luminous subassembly is configured to cooperate with the optical projection system in order to generate a first light beam with a cutoff edge formed by the imaging of the rear end edge of the first collector, and the second luminous subassembly is configured to cooperate with the optical projection system in order to generate a second light beam different than the first light beam, at least a part of which is situated above the cutoff edge.

11. An automotive vehicle luminous module comprising at least a first luminous unit and a second luminous unit, the first luminous unit includes a first luminous subassembly includes at least a first light source configured to emit a plurality of first light rays and a first collector configured to collect and reflect the first light rays emitted by the first light source, a second luminous subassembly includes at least a second light source configured to emit a plurality of second light rays and a second collector configured to collect and reflect the second light rays emitted by the second light source, an optical projection system configured to project the first light rays reflected by the first collector and the second light rays reflected by the second collector, the optical projection system includes an optical axis parallel to a longitudinal direction, wherein the first collector and the second collector are offset with respect to one another along the longitudinal direction such that the first collector is arranged between the second collector and the optical projection system, and are offset with respect to one another along a transverse direction perpendicular to the longitudinal direction, and the optical projection system has an optical line focus parallel or substantially parallel to the transverse direction, the first collector includes a first rear edge disposed in a vicinity of the optical line focus of the optical projection system, the second collector includes an object focus at which the second light source is positioned and an image focus at least partially coincident with the optical line focus of the optical projection system, wherein the second collector includes at least two reflective cavities, each of the reflective cavities being offset with respect to one another along the transverse direction.

12. The luminous module as claimed in claim 11, wherein the second luminous unit includes at least one additional luminous subassembly and an additional optical projection system.

13. The luminous module as claimed in claim 12, wherein the optical projection system is formed by a projection lens, and the additional optical projection system is formed by a projection lens, referred to as additional projection lens, the luminous module includes a projection unit divided into a first portion delimiting the projection lens of the first luminous unit and a second portion delimiting the additional projection lens of the second luminous unit.

* * * * *